US009975728B2

(12) United States Patent
Gelmetti et al.

(10) Patent No.: US 9,975,728 B2
(45) Date of Patent: May 22, 2018

(54) WIRE CONTAINER LID, WIRE CONTAINER AND WIRE FEEDING SYSTEM

(71) Applicant: SIDERGAS SPA, S. Ambrogio di Valpolicella (IT)

(72) Inventors: Carlo Gelmetti, Lazise (IT); Filippo Corradini, Isera (IT); Fabio Perazzoli, Lazise (IT)

(73) Assignee: SIDERGAS SPA (IT)

( * ) Notice: Subject to any disclaimer, the term of this patent is extended or adjusted under 35 U.S.C. 154(b) by 174 days.

(21) Appl. No.: 14/850,753

(22) Filed: Sep. 10, 2015

(65) Prior Publication Data

US 2017/0073180 A1    Mar. 16, 2017

(51) Int. Cl.

| B65H 57/18 | (2006.01) |
|---|---|
| B65D 43/02 | (2006.01) |
| B65H 75/16 | (2006.01) |
| B65H 57/12 | (2006.01) |
| B65D 85/04 | (2006.01) |
| B65H 49/08 | (2006.01) |
| B23K 9/133 | (2006.01) |

(52) U.S. Cl.
CPC ........... *B65H 57/18* (2013.01); *B23K 9/1333* (2013.01); *B65D 43/02* (2013.01); *B65D 85/04* (2013.01); *B65H 49/08* (2013.01); *B65H 57/12* (2013.01); *B65H 75/16* (2013.01); *B65H 2701/36* (2013.01)

(58) Field of Classification Search
CPC .... B65H 57/12; B65H 57/18; B65H 2701/36; B65H 75/16; B65H 49/08; B65D 43/02; B65D 85/04; B23K 9/1333
See application file for complete search history.

(56) References Cited

U.S. PATENT DOCUMENTS

| 318,062 A | 5/1885 | Warren |
|---|---|---|
| 532,565 A | 1/1895 | Kilmer |

(Continued)

FOREIGN PATENT DOCUMENTS

| CN | 202240091 | 5/2012 | ............ B23K 9/133 |
|---|---|---|---|
| DE | 152978 | 8/1903 | |

(Continued)

OTHER PUBLICATIONS

Extended European Search Report issued in application No. 15168866.0, dated Dec. 22, 2015 (6 pgs).

(Continued)

*Primary Examiner* — William E Dondero
(74) *Attorney, Agent, or Firm* — Hayes Soloway P.C.

(57) ABSTRACT

A wire feeding system comprises a wire container including a box having an open upper side, and a wire container lid closing the upper side. The wire container lid includes a front wall having an opening through which wire is to be paid off. A wire outlet guide is attached to the front wall. The wire outlet guide comprises an upper and a lower hole for receiving the wire, the upper and lower holes being defined by a lower ring wall and an upper ring wall, respectively, and being distanced from each other in a wire feeding direction. At least the lower ring wall limits sideward movement of the wire and allows contact with the wire. The holes have a fixed position relative to the front wall. A deflection space bridging the distance between the holes allows sideward deflection of the wire between the ring walls.

19 Claims, 14 Drawing Sheets

(56) References Cited

U.S. PATENT DOCUMENTS

| | | | |
|---|---|---|---|
| 617,353 A | 1/1899 | Redmond | |
| 627,722 A | 6/1899 | Edwards | |
| 932,808 A | 8/1909 | Pelton | |
| 1,276,117 A | 8/1918 | Riebe | 464/171 |
| 1,468,994 A | 9/1923 | Cook | 206/393 |
| 1,508,689 A | 9/1924 | Glasser | 219/124.03 |
| 1,640,368 A | 8/1927 | Obetz | |
| 1,821,354 A | 9/1931 | Meyer | 242/159 |
| 1,907,051 A | 5/1933 | Emery | |
| 1,936,227 A | 11/1933 | Cook | 206/59 |
| 2,027,670 A | 1/1936 | Broeren | 312/62 |
| 2,027,674 A | 1/1936 | Broeren | 312/60 |
| 2,078,161 A | 4/1937 | Rietsch | 74/297 |
| 2,260,230 A | 10/1941 | Olson | 229/119 |
| 2,319,628 A | 5/1943 | Pinniger | 220/485 |
| 2,329,369 A | 9/1943 | Haver | 285/11 |
| 2,366,101 A | 12/1944 | Grothey | 66/125 R |
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,752,108 A | 6/1956 | Richardson | 242/128 |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,028,066 A | 4/1962 | Bumby | 220/23.9 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,284,608 A | 11/1966 | McDonald | 219/137.43 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,586,222 A | 6/1971 | Rosen | 226/1 |
| 3,595,277 A | 7/1971 | Lefever | |
| 3,630,425 A | 12/1971 | Wilkens | 226/108 |
| 3,648,920 A | 3/1972 | Stump | |
| 3,659,737 A | 5/1972 | Garbe | 217/12 R |
| 3,672,655 A | 6/1972 | Carter | 226/108 |
| 3,675,499 A | 7/1972 | Marosy | 24/573.11 |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,939,978 A | 2/1976 | Thomaswick | 206/454 |
| 3,958,712 A | 5/1976 | Martin | 211/40 |
| 4,000,797 A | 1/1977 | Ducanis | 193/38 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,161,248 A | 7/1979 | Kalmanovitch | 206/389 |
| 4,171,783 A | 10/1979 | Waltemath | 242/128 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,293,103 A | 10/1981 | Tsukamoto | |
| 4,392,606 A | 7/1983 | Fremion | 206/600 |
| 4,396,797 A | 8/1983 | Sakuragi et al. | 174/68 |
| 4,451,014 A | 5/1984 | Kitt et al. | 242/128 |
| 4,464,919 A | 8/1984 | Labbe | |
| 4,516,692 A | 5/1985 | Croley | 222/105 |
| 4,531,040 A | 7/1985 | Nawa | 219/136 |
| 4,540,225 A | 9/1985 | Johnson et al. | 439/192 |
| 4,546,631 A | 10/1985 | Eisinger | |
| 4,575,612 A | 3/1986 | Prunier | 219/137.43 |
| 4,581,514 A | 4/1986 | Inoue | 204/225 |
| 4,582,198 A | 4/1986 | Ditton | |
| 4,585,487 A | 4/1986 | Destree et al. | |
| 4,623,063 A | 11/1986 | Balkin | |
| 4,795,057 A | 1/1989 | Jungels et al. | 206/386 |
| 4,868,366 A | 9/1989 | Joseph et al. | 219/137.71 |
| 4,869,367 A | 9/1989 | Kawasaki et al. | 206/409 |
| 4,891,493 A | 1/1990 | Sato et al. | 219/137 |
| 4,916,282 A | 4/1990 | Chamming et al. | 219/69.2 |
| 4,918,286 A | 4/1990 | Boyer | 219/137.44 |
| 4,949,567 A | 8/1990 | Corbin | 72/164 |
| 4,974,789 A | 12/1990 | Milburn | 242/159 |
| 5,051,539 A | 9/1991 | Leathers-Wiessner | 174/15.7 |
| 5,078,269 A | 1/1992 | Dekko et al. | 206/397 |
| 5,097,951 A | 3/1992 | Pigott | 206/397 |
| 5,105,943 A | 4/1992 | Lesko et al. | 206/397 |
| 5,109,983 A | 5/1992 | Malone et al. | 206/408 |
| 5,165,217 A | 11/1992 | Sobel et al. | 242/159 |
| 5,201,419 A | 4/1993 | Hayes | 206/409 |
| 5,205,412 A | 4/1993 | Krieg | 206/394 |
| 5,215,338 A | 6/1993 | Kimura et al. | 285/166 |
| 5,227,314 A | 7/1993 | Brown et al. | 437/10 |
| 5,261,625 A | 11/1993 | Lanoue | 242/129.8 |
| 5,277,314 A | 1/1994 | Cooper et al. | 206/398 |
| 5,279,441 A | 1/1994 | Featherall | 220/485 |
| 5,314,111 A | 5/1994 | Takaku et al. | 229/110 |
| 5,368,245 A | 11/1994 | Fore | 242/171 |
| 5,372,269 A | 12/1994 | Sutton et al. | 220/62 |
| 5,452,841 A | 9/1995 | Sibata et al. | 228/180.5 |
| 5,485,968 A | 1/1996 | Fujioka | 242/172 |
| 5,494,160 A | 2/1996 | Gelmetti | 206/395 |
| 5,553,810 A | 9/1996 | Bobeczko | 242/601 |
| 5,585,013 A | 12/1996 | Truty | 219/69.12 |
| 5,586,733 A | 12/1996 | Miura et al. | 242/125.2 |
| 5,692,700 A | 12/1997 | Bobeczko | 242/588.2 |
| 5,702,001 A | 12/1997 | Russell et al. | 206/388 |
| 5,738,209 A | 4/1998 | Burr et al. | 206/397 |
| 5,746,380 A | 5/1998 | Chung | 242/171 |
| 5,758,834 A | 6/1998 | Dragoo et al. | 242/128 |
| 5,778,939 A | 7/1998 | Hok-Yin | 138/120 |
| 5,816,466 A | 10/1998 | Seufer | 226/187 |
| 5,819,934 A | 10/1998 | Cooper | 206/397 |
| 5,845,862 A | 12/1998 | Cipriani | 242/423.1 |
| 5,865,051 A | 2/1999 | Otzen et al. | 72/17.3 |
| 5,921,391 A | 7/1999 | Ortiz et al. | 206/397 |
| 5,931,408 A | 8/1999 | Ishii et al. | 242/580 |
| 5,932,123 A | 8/1999 | Marhofer | 219/125.11 |
| 5,971,308 A | 10/1999 | Boulton | 242/131 |
| 5,988,370 A | 11/1999 | Roemer et al. | 206/215 |
| 6,016,911 A | 1/2000 | Chen | 200/395 |
| 6,019,303 A | 2/2000 | Cooper | 424/361.4 |
| 6,150,632 A | 11/2000 | Fisher | 219/137.71 |
| 6,159,591 A | 12/2000 | Beihoffer et al. | 428/327 |
| 6,236,017 B1 | 5/2001 | Smartt | 219/130.01 |
| 6,255,371 B1 | 7/2001 | Schlosser et al. | 524/100 |
| 6,301,944 B1 | 10/2001 | Offer | 72/79 |
| 6,409,116 B1 | 6/2002 | Brown | 242/419.1 |

(56) References Cited

U.S. PATENT DOCUMENTS

| | | | |
|---|---|---|---|
| 6,425,549 B1 | 7/2002 | Bae et al. | 242/580 |
| 6,464,077 B1 | 10/2002 | Liu | 206/388 |
| 6,479,793 B1 | 11/2002 | Wittmann | 219/130.5 |
| 6,547,176 B1 | 4/2003 | Blain et al. | 242/423.1 |
| 6,564,943 B2 | 5/2003 | Barton et al. | 206/395 |
| 6,636,776 B1 | 10/2003 | Barton et al. | 700/169 |
| 6,648,141 B2 | 11/2003 | Land | 206/408 |
| 6,649,870 B1 | 11/2003 | Barton et al. | 219/137 |
| 6,708,864 B2 | 3/2004 | Ferguson, III et al. | 228/56.3 |
| 6,715,608 B1 | 4/2004 | Moore | 206/397 |
| 6,745,899 B1 | 6/2004 | Barton | 206/409 |
| 6,749,139 B2 | 6/2004 | Speck | 206/409 |
| 6,831,251 B1 | 12/2004 | Artelsmair | B23K 9/1336 |
| 6,889,835 B2 | 5/2005 | Land | 206/408 |
| 6,913,145 B2 | 7/2005 | Barton | 206/409 |
| 6,938,767 B2 | 9/2005 | Gelmetti | 206/408 |
| 6,977,357 B2 | 12/2005 | Hsu et al. | 219/130.01 |
| 7,004,318 B2 | 2/2006 | Barton | 206/409 |
| 7,147,176 B2 | 12/2006 | Rexhaj | 242/417.3 |
| 7,152,735 B2 | 12/2006 | Dragoo et al. | 206/408 |
| 7,156,334 B1 | 1/2007 | Fore et al. | 242/171 |
| 7,178,755 B2 | 2/2007 | Hsu et al. | 242/423.1 |
| 7,198,152 B2 | 4/2007 | Barton et al. | 206/409 |
| 7,220,942 B2 | 5/2007 | Barton et al. | 219/137.7 |
| 7,301,124 B2 | 11/2007 | Kaufman | 219/137.71 |
| 7,309,038 B2 | 12/2007 | Carroscia | 206/409 |
| 7,377,388 B2 | 5/2008 | Hsu et al. | 206/389 |
| RE40,351 E | 6/2008 | Cipriani | 242/423.1 |
| 7,398,881 B2 | 7/2008 | Barton et al. | 206/408 |
| 7,410,111 B2 | 8/2008 | Carroscia | 242/566 |
| 7,441,657 B2 | 10/2008 | Gelmetti | 206/393 |
| 7,441,721 B2 | 10/2008 | Bae et al. | 242/128 |
| 7,533,906 B2 | 5/2009 | Luettgen et al. | 285/146.1 |
| 7,748,530 B2 | 7/2010 | Hsu et al. | 206/408 |
| 7,950,523 B2 | 5/2011 | Gelmetti | 206/408 |
| 8,207,475 B2 | 6/2012 | Minato et al. | 219/137.31 |
| 8,225,977 B2 | 7/2012 | Meckler | 226/1 |
| 8,235,210 B2 | 8/2012 | De Lacerda et al. | 206/393 |
| 8,882,018 B2 | 11/2014 | Gelmetti | 242/128 |
| 9,414,759 B2 | 8/2016 | Lang | A61B 5/04087 |
| 2001/0020663 A1 | 9/2001 | Petersen | 242/485.7 |
| 2002/0000391 A1 | 1/2002 | Kawasai et al. | 206/408 |
| 2002/0014477 A1 | 2/2002 | Lee et al. | |
| 2002/0108985 A1 | 8/2002 | Garcia et al. | 226/45 |
| 2002/0120178 A1 | 8/2002 | Tartaglia et al. | 600/114 |
| 2003/0042162 A1 | 3/2003 | Land | 206/408 |
| 2003/0042163 A1 | 3/2003 | Cipriant | |
| 2003/0052030 A1 | 3/2003 | Gelmetti | 206/397 |
| 2003/0184086 A1 | 10/2003 | Christianson | 285/146.1 |
| 2004/0011776 A1 | 1/2004 | Mukai | B23K 9/1336 |
| 2004/0020041 A1 | 2/2004 | Ferguson, III et al. | |
| 2004/0155090 A1 | 8/2004 | Jensen | |
| 2005/0258290 A1* | 11/2005 | Kuper | B23K 9/133 |
| | | | 242/171 |
| 2006/0016792 A1 | 1/2006 | Uecker et al. | 219/137.71 |
| 2006/0027699 A1 | 2/2006 | Bae et al. | |
| 2006/0070987 A1 | 4/2006 | Daniel | 219/137.71 |
| 2006/0131293 A1 | 6/2006 | Kaufman | 219/137.71 |
| 2006/0138116 A1 | 6/2006 | Lipnevicius | 219/137.71 |
| 2006/0196794 A1 | 9/2006 | Nicklas | 206/389 |
| 2006/0207981 A1 | 9/2006 | Diekmann | 219/137.2 |
| 2006/0258824 A1 | 11/2006 | Oshima et al. | 525/533 |
| 2007/0045141 A1 | 3/2007 | Gelmetti | 206/409 |
| 2007/0056943 A1 | 3/2007 | Tenbrink | 219/130.01 |
| 2007/0151964 A1 | 7/2007 | Artelsmair et al. | 219/137.2 |
| 2007/0158324 A1 | 7/2007 | O'Donnell | 219/137.71 |
| 2007/0175786 A1 | 8/2007 | Nicklas | |
| 2007/0175965 A1 | 8/2007 | Carroscia | 228/4.5 |
| 2007/0272573 A1 | 11/2007 | Gelmetti | |
| 2007/0284354 A1 | 12/2007 | Laymon | 219/137.51 |
| 2008/0156925 A1 | 7/2008 | Cooper | 242/559.3 |
| 2008/0257874 A1 | 10/2008 | Kaufman et al. | 219/137 R |
| 2008/0257875 A1 | 10/2008 | De Keizer | 219/137.44 |
| 2008/0314876 A1 | 12/2008 | Pinsonneault et al. | 219/74 |
| 2009/0014572 A1 | 1/2009 | Weissbrod et al. | |
| 2009/0014579 A1 | 1/2009 | Bender et al. | |
| 2009/0200284 A1 | 8/2009 | Sanchez | 219/137.51 |
| 2010/0116803 A1 | 5/2010 | Gelmetti | 219/138 |
| 2011/0042355 A1 | 2/2011 | Gelmetti | B23K 9/1333 |
| 2011/0073703 A1 | 3/2011 | Gelmetti et al. | 242/615.2 |
| 2011/0094911 A1 | 4/2011 | Gelmetti | 206/408 |
| 2011/0114523 A1 | 5/2011 | Gelmetti | 206/407 |
| 2011/0114617 A1 | 5/2011 | Gelmetti et al. | 219/137.9 |
| 2011/0132880 A1 | 6/2011 | Kossowan | 219/76.14 |
| 2012/0160819 A1 | 6/2012 | Enyedy | 219/137.71 |
| 2012/0298630 A1 | 11/2012 | Stoutamire | 219/75 |
| 2013/0112676 A1 | 5/2013 | Hutchison | B23K 9/09 |
| 2013/0180971 A1 | 7/2013 | Peters et al. | 219/137.7 |
| 2013/0193124 A1 | 8/2013 | Peters | 219/121.63 |
| 2013/0193259 A1 | 8/2013 | Weissbrod et al. | 242/566 |
| 2013/0200055 A1 | 8/2013 | Enyedy | 219/130.21 |
| 2014/0076872 A1 | 3/2014 | Ott | 219/132 |

FOREIGN PATENT DOCUMENTS

| | | | |
|---|---|---|---|
| DE | 2202177 | 7/1973 | B65H 54/76 |
| DE | 2525938 | 12/1976 | B23K 9/18 |
| DE | 28 16 100 | 10/1978 | C08G 63/68 |
| DE | 103 60 466 | 7/2005 | B23K 9/133 |
| DE | 102007015946 | 10/2008 | |
| DE | 202011104120 | 1/2012 | B23K 9/133 |
| EP | 0017445 | 10/1980 | B65H 59/10 |
| EP | 0519424 A1 | 12/1992 | B23K 9/1333 |
| EP | 0584056 | 2/1994 | B65D 85/04 |
| EP | 0665 166 | 1/1995 | B65D 5/44 |
| EP | 1057751 A1 | 12/2000 | |
| EP | 1 275 595 | 1/2003 | B65D 85/04 |
| EP | 1 295 813 | 3/2003 | B65D 85/04 |
| EP | 1357059 A2 * | 10/2003 | B23K 9/1333 |
| EP | 1 471 024 | 10/2004 | B65H 49/08 |
| EP | 1 698 421 | 6/2006 | B23K 9/133 |
| EP | 1932613 | 6/2008 | B23K 9/133 |
| EP | 1 974 846 | 10/2008 | B23K 9/133 |
| EP | 2 256 064 | 1/2010 | B65H 49/08 |
| EP | 2 354 039 | 1/2010 | |
| EP | 2 168 706 | 3/2010 | B23K 9/133 |
| EP | 2 286 950 | 2/2011 | B23K 9/133 |
| EP | 2484476 | 8/2012 | B23K 9/32 |
| EP | 2695696 | 2/2014 | B23K 9/12 |
| EP | 2933202 | 10/2015 | |
| EP | 2949416 | 12/2015 | B23K 9/133 |
| FR | 2595674 | 3/1988 | B21C 47/14 |
| FR | 2 888 825 | 1/2007 | B65H 57/14 |
| GB | 880502 | 10/1961 | B21C 47/14 |
| GB | 1168928 | 10/1969 | D07B 7/10 |
| GB | 1229913 | 4/1971 | B21C 47/14 |
| GB | 2059462 | 4/1981 | A23G 3/02 |
| GB | 2 264 482 | 9/1993 | |
| GB | 2 332 451 | 6/1999 | B65H 57/18 |
| GB | 199 10 128 | 1/2001 | A61B 1/008 |
| JP | 54-035842 | 3/1979 | B65D 1/28 |
| JP | 54-043856 | 4/1979 | B21C 47/08 |
| JP | 55-054295 | 4/1980 | B23K 35/02 |
| JP | S55112176 | 8/1980 | B23K 9/12 |
| JP | 55-156694 | 12/1980 | B23K 35/368 |
| JP | 56-023376 | 3/1981 | B23K 9/00 |
| JP | 57-102471 | 6/1982 | B65H 54/82 |
| JP | 58-035068 | 3/1983 | B23K 9/12 |
| JP | 59-197386 | 11/1984 | B23K 11/30 |
| JP | 59-229287 | 12/1984 | B23K 9/12 |
| JP | 59-232669 | 12/1984 | B23K 9/12 |
| JP | 60-021181 | 2/1985 | B23K 9/12 |
| JP | 60-082275 | 5/1985 | B23K 9/12 |
| JP | 60-082276 | 5/1985 | B23K 9/12 |
| JP | 60-184422 | 9/1985 | B21C 47/26 |
| JP | 60-223664 | 11/1985 | B23K 9/12 |
| JP | 61-293674 | 12/1986 | B23K 9/12 |
| JP | 62-009774 | 1/1987 | B23K 9/12 |
| JP | 62-111872 | 5/1987 | B65H 49/08 |
| JP | 62-287055 | 12/1987 | C22F 1/10 |
| JP | 63-147781 | 6/1988 | B65H 59/06 |
| JP | 1-240222 | 9/1989 | |
| JP | 3-264169 | 11/1991 | B23K 9/133 |
| JP | 03264169 A | 11/1991 | B23K 9/133 |

(56) References Cited

FOREIGN PATENT DOCUMENTS

| | | | | |
|---|---|---|---|---|
| JP | 4-112169 | 4/1992 | ............... | B23K 9/12 |
| JP | 04-133973 | 5/1992 | ............. | B65H 59/06 |
| JP | 4-274875 | 9/1992 | ............. | B21C 47/04 |
| JP | H05104248 | 4/1993 | ............... | B23K 9/10 |
| JP | H05112352 | 5/1993 | ............. | B65D 5/44 |
| JP | 5-178538 | 7/1993 | ............. | B65H 59/06 |
| JP | 7/247058 | 9/1995 | ............. | B21C 47/24 |
| JP | 8-40642 | 2/1996 | ............. | B21C 47/28 |
| JP | 08-150492 | 6/1996 | ............. | B23K 35/02 |
| JP | 08-267274 | 10/1996 | ............. | B23K 35/30 |
| JP | 2000-202630 | 7/2000 | ............. | B23K 9/133 |
| JP | 2000-225468 | 8/2000 | ............... | B23K 9/12 |
| JP | 2000-263239 | 9/2000 | ............. | B23K 11/00 |
| JP | 2001-26375 | 1/2001 | ............. | B65H 75/16 |
| JP | 2001-150187 | 6/2001 | ............... | B21D 3/06 |
| JP | 2004-025242 | 1/2004 | ............. | B23K 35/20 |
| JP | 2004-025243 | 1/2004 | ............. | B23K 9/12 |
| JP | 2005-169499 | 6/2005 | ............. | B23K 9/133 |
| JP | 2007-29971 | 2/2007 | ............. | B23K 9/133 |
| KR | 2002-0077857 | 10/2002 | ............. | B65D 85/04 |
| KR | 1020040059891 | 7/2004 | ............. | B23K 9/133 |
| WO | WO 81/03319 | 11/1981 | ............. | B65D 25/52 |
| WO | WO 8810230 | 12/1988 | ............. | B65H 49/08 |
| WO | WO 94-19258 | 9/1994 | ............... | B65D 5/10 |
| WO | WO 98/52844 | 11/1998 | ............. | B65D 85/04 |
| WO | WO 00-50197 | 8/2000 | ............. | B23C 19/00 |
| WO | WO 02/094493 | 11/2002 | | |
| WO | WO 03-106096 A1 | 12/2003 | ............. | B21C 47/20 |
| WO | WO2005042201 | 5/2005 | ............. | B23K 9/133 |
| WO | WO 2005/061168 | 7/2005 | | |
| WO | 2006091075 | 8/2006 | ............. | B23K 9/133 |
| WO | WO 2007/010171 | 1/2007 | ............. | B65H 57/00 |
| WO | WO 2007/112972 | 10/2007 | ............. | B23K 9/133 |
| WO | WO 2007/149689 | 12/2007 | ............. | B65H 57/18 |
| WO | WO 2009/007845 | 1/2009 | ............. | B23K 9/133 |
| WO | WO2009027784 | 3/2009 | ............. | B23K 9/133 |
| WO | WO 2009/143917 | 12/2009 | ............. | B65H 57/14 |
| WO | WO 2011/147565 | 12/2011 | ............. | B23K 9/133 |
| WO | WO 2013/092658 | 6/2013 | ............. | B65H 57/18 |

OTHER PUBLICATIONS

Office Action issued in U.S. Appl. No. 14/195,497, dated Mar. 23, 2017 (24 pgs).
Office Action issued in U.S. Appl. No. 13/912,016, dated Apr. 21, 2017 (25 pgs).
European Search Report issued in application No. 16160312.1, dated Sep. 19, 2016 (7 pgs).
Office Action issued in U.S. Appl. No. 13/912,016, dated Sep. 22, 2016 (13 pgs).
Office Action issued in U.S. Appl. No. 14/195,497, dated Sep. 9, 2016 (21 pgs).
Office Action issued in U.S. Appl. No. 14/481,722, dated Nov. 4, 2016 (18 pgs).
Office Action issued in U.S. Appl. No. 14/195,497, dated May 19, 2016 (35 pgs).
Office Action issued in U.S. Appl. No. 14/289,090, dated Aug. 4, 2016 (10 pgs).
Office Action issued in U.S. Appl. No. 14/481,722, dated Jun. 14, 2016 (25 pgs).
European Office Action issued in application No. 16180212.9, dated Jan. 19, 2017 (7 pgs).
Office Action issued in U.S. Appl. No. 14/481,722, dated Jan. 26, 2017 (16 pgs).
Office Action issued in U.S. Appl. No. 14/679,768, dated Jan. 30, 2017 (57 pgs).
OfficeAction issued in U.S. Appl. No. 14/289,090, dated Feb. 13, 2017 (21 pgs).
U.S. Appl. No. 10/526,539, filed Mar. 3, 2005.
U.S. Appl. No. 10/596,697, filed Jun. 21, 2006.
U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.
U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/289,090, filed May 28, 2014.
U.S. Appl. No. 14/481,722, filed Sep. 9, 2014.
U.S. Appl. No. 14/679,768, filed Apr. 6, 2015.
U.S. Appl. No. 13/744,394, filed Jan. 17, 2013 Gelmetti et al.
U.S. Appl. No. 13/912,016, filed Jun. 6, 2013 Gelmetti.
U.S. Appl. No. 14/195,497, filed Mar. 3, 2014 Gelmetti et al.
U.S. Appl. No. 14/289,090, filed May 28, 2014 Gelmetti et al.
U.S. Appl. No. 14/679,768, filed Apr. 6, 2015 Gelmetti et al.
U.S. Appl. No. 14/481,722, filed Sep. 9, 2014 Gelmetti et al.
Office Action issued in U.S. Appl. No. 14/195,497, dated Sep. 7, 2017 (29 pgs).
Office Action issued in U.S. Appl. No. 14/289,090, dated Sep. 18, 2017 (27 pgs).
Office Action issued in U.S. Appl. No. 14/481,722, dated Jul. 17, 2017 (23 pgs).
Office Action issued in U.S. Appl. No. 14/679,768, dated Aug. 2, 2017 (33 pgs).
European Office Action for corresponding application No. 10 014 553.1-2302, dated Apr. 3, 2012 (4 pgs).
European Search Report, dated Mar. 2, 2011 (7 pgs).
European Search Report, dated Sep. 17, 2008.
Extended European Search Report issued in related application No. 13179908.2, dated Nov. 13, 2013 (6 pgs).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Italian Search Report issued in related application No. MI20121423, dated Apr. 29, 2013 (2 pgs).
Notice of Allowance dated Mar. 5, 2013 issued in U.S. Appl. No. 12/593,271 (15 pgs).
Notice of Allowance issued in related U.S. Appl. No. 12/917,320 dated Jun. 18, 2012 (25 pgs).
Notice of Allowance issued in related U.S. Appl. No. 13/330,314, dated Sep. 11, 2014 (17 pgs).
Office Action issued for related U.S. Appl. No. 12/618,250, dated Apr. 26, 2012 (11 pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/572,994, dated Apr. 24, 2013 (22 pgs).
Office Action issued in related U.S. Appl. No. 12/593,271 dated Aug. 31, 2012 (7pgs).
Office Action issued in related U.S. Appl. No. 12/789,095 dated Jun. 12, 2012 (8pgs).
Office Action issued in related U.S. Appl. No. 13/330,314, dated Jun. 20, 2014 (14 pgs).
Office Action issued in related U.S. Appl. No. 14/030,879, dated Dec. 1, 2014 (38 pgs).

(56) References Cited

OTHER PUBLICATIONS

PCT International Search Report, dated Nov. 6, 2008.
Search Report received in Applicant's counterpart European Patent Application Serial No. 08017572.2-2302.
Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
U.S. Office Action issued in related U.S. Appl. No. 12/572,994, dated Sep. 17, 2013 (13 pgs).
US Official Action dated Dec. 14, 2012, issued in U.S. Appl. No. 12/994,686 (17 pgs).
US Official Action dated Mar. 5, 2013 issued in U.S. Appl. No. 13/382,491 (33 pgs).
European Search Report issued in application No. 17191662.0, dated Mar. 15, 2018 (8 pgs).
Notice of Allowance issued in U.S. Appl. No. 15/295,797, dated Feb. 13, 2018 (18 pgs).
Office Action issued in U.S. Appl. No. 13/912,016, dated Dec. 15, 2017 (25 pgs).
Office Action issued in U.S. Appl. No. 14/195,497, dated Feb. 23, 2018 (30 pgs).
Office Action issued in U.S. Appl. No. 14/289,090, dated Jan. 4, 2018 (18 pgs).
Office Action issued in U.S. Appl. No. 14/481,722, dated Dec. 12, 2017 (16 pgs).
Office Action issued in U.S. Appl. No. 14/679,768, dated Jan. 12, 2018 (26 pgs).
Office Action issued in U.S. Appl. No. 15/295,797, dated Dec. 14, 2017 (57 pgs).
Office Action issued in U.S. Appl. No. 15/295,797, dated Mar. 5, 2018 (9 pgs).

* cited by examiner

State of the Art

State of the Art

State of the Art

WIRE CONTAINER LID, WIRE CONTAINER AND WIRE FEEDING SYSTEM

FIELD OF THE INVENTION

The invention relates to a wire container lid for closing an upper side of a wire box filled with coiled wire, in particular for a welding wire container lid. Furthermore, the invention relates to a wire container, in particular a welding wire container, and to a wire feeding system comprising a wire container.

Such wire containers usually comprise coiled steel and aluminum welding wires or metal spray wires or any other wire in applications where the wire is paid out from a large bulk container, pack or drum.

BACKGROUND

Wire feeding systems are commonly used for feeding welding wires from a supply source, for example a container in which a significant amount (up to more than one ton) of welding wire is being stored, to a point called welding arc where the welding wire is being deposited through a welding torch, with the purpose of joining metal parts.

In robotic and automated applications, which are designed to maximize the productivity, it has become a common practice to utilize large bulk packs containing from few hundred kilograms to more than one ton of welding wire. In the initial, and now obsolete automatic setups, the packs were placed on rotating turntables and the rotational movement of the pack helped offset the tension naturally building on the wire during its payout. For safety and practical reasons, like the shop floor space limitation in plants, the past two decades have seen a wide use of the so called "twist-free" "torsionless" welding wires being paid out from a stationary pack and the wire being deposited into the container through a special winding process. The twist-free winding process has been known for quite some time.

The welding wire is drawn from a manufacturing process and runs over rollers, is pulled along by a capstan and is fed into a rotatable cylindrical tube comprising an opening at the bottom or along the cylinder adjacent to the bottom. The wire extends through the tube and out the opening, whereupon it is placed into the storage container.

The tube protrudes into the storage container and rotates about an axis parallel to the storage container axis. The wire is fed into the tube by the capstan and at a rotational velocity different than the rotational velocity of the tube. A ratio between the rotational velocities of the tube and the capstan defines a loop size diameter of the wire within the storage container.

The twist-free winding however is not a simple process and it can be negatively affected by a number of variables, like the columnar strength of the wire, its diameter or its surface condition. In particular, aluminum welding wires are difficult to become plastically deformed and pre-twisted, because of their elasticity; moreover their rougher surface condition increases the friction and complicates the feeding through the conduit guiding the wire into the pack. Although the twist-free winding machines of most recent construction are provided with a variety of controls and adjusting options, it is virtually impossible to continuously and dynamically compensate the inevitable wire deformations and defects. If the twist-free torsion-free winding machine is unable to completely eliminate the residual wire tension while laying it down into the container, this residual tension increasingly accumulates on the wire during the payout process until the wire is so loaded that it will eventually tangle and jam inside the pack and cause an unwanted interruption of the welding process. In the case of automatic and robotic welding, unwanted weld interruptions caused by wire tangles can be extremely expensive and can impact the complete production line with costly production downtime, bad welds and weld repairs.

It is therefore an object of the present invention to provide a system that can help minimize and even eliminate the accumulation of tension on the wire during its payout from the bulk pack.

It is a further object of the present invention to provide a system that can help improve the safety around the wire bulk pack, allow a visual access of the wire during its payoff and protect the wire itself from possible contamination.

SUMMARY

The present invention provides a wire container lid for closing an upper side of a wire box filled with coiled wire, the lid comprising
a front wall having an opening through which wire is to be paid off,
a wire outlet guide attached to the front wall,
the wire outlet guide comprising an upper and a lower hole for receiving the wire, the upper and lower holes being defined by a lower ring wall and an upper ring wall, respectively, and being distanced from each other in a wire feeding direction,
at least the lower ring wall limiting sideward movement of the wire and allowing contact with the wire,
the holes having a fixed position relative to the front wall, and
a deflection space bridging the distance between the holes for allowing sideward deflection and swing of the wire between the ring walls.

Tests conducted on various setup configurations have evidenced that the less spacing between the point where the wire strand is pulled from its coil and the point where it enters the guiding conduit, the faster enough tension will accumulate to cause a tangle. On the contrary, more spacing between wire coil and conduit entrance can considerably delay the tension accumulation and the consequent tangle.

However, if the wire has residual tension even after the twist-free winding into the pack, which is a frequent occurrence with aluminum welding wires, no matter how distant is the conduit entrance point from the coil, tension will inevitably accumulate and eventually a tangle will occur anyway.

The present invention provides a wire container lid which can be used with wire boxes of conventional design. The wire container lid provides a wire outlet guide of a specific length which comprises two separate ring walls which limits two holes defining strictures with respect to the deflection space. At least the lower limits the sideward movement of the wire and guides the wire. However, the strictures are distanced by a deflection space in which the wire is allowed to sidewardly deflect and sidewardly swing contrary to the holes. In contrast to prior art containers with lids to which a rotating bow-shaped tube is attached through which the wire is guided and which extends into the interior of the container, the wire outlet guide of the lid according to the present invention has no rotating holes of the wire outlet guide rather than holes having a fixed, permanent position with respect to the container. Moreover and in contrast to the rotating bow-shaped tubes, the wire is allowed to deflect between a first, inlet hole (lower hole) and a second, outlet hole (upper hole).

It has been noted that if the wire passes through a stricture and has the possibility to travel afterwards through a relatively wider space, the tension moves forward rather than building up backward and this helps preventing the formation of tangles and knots inside the pack. The more residual tension on the wire after the twist-free winding process, the more the wire swings sideways in the open space after the stricture.

The wire outlet guide can be fixedly or shiftably attached to the front wall, and both can be separately produced and attached to each other. If a gap between the wire outlet guide and the front wall is provided, this gap can be closed and sealed by a brush, flexible rubber or foam.

The wire outlet guide may have a connection wall connecting the ring walls to each other. The connection wall is radially distanced by at least 10 mm from a virtual cylinder of maximum cross-section extending through both holes and contacting at least one ring wall. The connection wall, therefore, allows the deflection of the wire between the ring walls.

The connection wall can be defined by one or more rods. However, according to one embodiment, the connection wall has one of a box-like and tube-like shape limiting an interior which defines the deflection space. The connection wall can be circumferentially closed and cylindrical so that the wire is protected by the connection wall and cannot get caught by the wall.

The connection wall can be transparent, e.g. of plexiglass, allowing a visual access of the wire during its payoff.

The connection wall may further carry an upper and a lower front wall closing the deflection space in axial direction. The upper wall comprises or carries the upper ring wall, and the lower front wall carries or comprises the lower ring wall. Therefore, the deflection space is able to protect the wire from possible contamination.

At least one of the ring walls can be defined by a ring-shaped insert part allowing to replace the insert part or to provide a quite low-quality end wall as friction occurs between the wire and the insert part. It would even be possible to produce the end walls by cardboard or plastic. The ring-shaped insert can be a nozzle made of a material having a higher hardness than the material of the wire, e.g. a nozzle made of a ceramic.

In order to have a deflection space of sufficient volume and length in feeding direction, the ring walls are distanced from each other by 350 to 600 mm.

The inner diameter of the deflection space can be between 50 and 120 mm.

The front wall has a lower side facing the interior of the box and an opposite upper side. The wire outlet guide protrudes from at least one of the upper and lower sides, i.e. the outlet guide may be attached to the front wall so as to protrude only to the inside of the box or protrude only to the outside of the box or, protrudes both to the inside and to the outside of the box.

In one of the embodiments, the wire outlet guide can be shifted or displaced in the feeding direction relative to the front wall. For transport purpose and for facilitated insert of the wires into the holes, the tube-like or box-like wire outlet guide is pushed to extend completely or mainly into the interior of the box. For the perfect welding operation, however, the wire outlet guide may be pulled to mainly or completely extend out of the box and to protrude from the upper side of the front wall so that there is a larger distance between the lower, insert hole of the wire outlet guide and the upper end of the wire coil package within the box.

The ring walls are defining an upper ring wall and a lower ring wall. The lower ring wall is closer to the interior of the box than the upper ring wall. The upper ring wall may define the wire guide of the lid which is most distanced from the front wall on its upper side, i.e., there is no further guide means provided on the lid.

After the container, the wire enters a wire guiding conduit which extends over several meters or dozens of meters to a wire consumer, e.g. a welding tool. The wire guiding conduit can be distanced from the upper ring wall or can be coupled to the upper ring wall by a quick coupling at the upper ring wall allowing an immediate decoupling from and coupling to an empty and a full container, respectively. The quick coupling part attached to the upper end wall can define the upper hole of the wire outlet guide.

However, some wire feeding systems are provided with wire rear feeders which include driven rollers arranged between the container and the wire guiding conduit. These wire rear feeders support wire front feeders arranged close to the welding tool. A quick coupling means at the upper ring wall even allows to simply and quickly attach the wire rear feeder to the container. The quick coupling further ensures a correct, firm position of the wire guiding conduit or the wire rear feeder relative to the wire outlet guide and its holes.

The present invention further comprises a wire container with a box having an open upper side and a wire which is coiled in the box and extends through the holes of the wire container lid according to the present invention. The wire is able to sidewardly deflect in the deflection space, whereas it is guided at least within the lower hole.

The front wall of the lid can be flat or provided with a central dome protruding outwardly. The dome comprises the wire outlet guide, i.e. the wire outlet guide is attached to the dome. Alternatively, the central dome could be of plastic and could be integrally formed with the transparent connection wall.

A retainer ring lying on the top of a package of coiled wire within the container improves controlled wire payoff. The wire freely extends from below the retainer ring to the lower hole of the wire outlet guide without any wire guiding means arranged therebetween. Therefore, the wire is guided between the retainer ring and the outside, i.e. the environment of the container, by the wire outlet guide, only.

The lid may have a circumferentially extending cylindrical wall protruding from an circumferential edge of the front wall and encompassing an upper end area of the box sidewall. By means of the cylindrical wall, the lid is fixed in sideward direction to and on the box. However, the lid is shiftable between a low position in which the front wall is close to or rests on an upper edge of the sidewall and a raised position in which the front wall is distanced from the upper edge and in which the container has a larger inner volume than in the low position. The box sidewall has at least one sidewardly protruding stop portion for the lid on which the lid rests in the raised position. The lifting of the lid allows to increase the distance between the upper end of the package of coiled wire and the lower hole of the wire outlet guide. By increasing this distance, the wire is allowed to freely move or swing within the container so that the risk of the wire tangling or jamming inside the pack is further reduced.

The stop portion can be a portion of the box sidewall which is defined by a cut in the box sidewall and which is bent outwardly along a hinge portion in which the stop integrally extends into the remainder of the box sidewall. The cut could be a V- or U-shaped cut so that a tongue-like portion of the sidewall is circumscribed by the cut. The tongue, however, remains attached to the remainder of the box sidewall.

The present invention further provides a wire feeding system comprising a wire container according to the present invention as described above. The wire is coiled in the box to form a package and extends through the holes of the wire outlet guide. A wire conduit, e.g. a tube, for transporting the wire to a tool or consumer has an inlet end for the inlet of the wire from the container. The inlet end can be distanced from the container or can be immediately attached to the container at the upper ring wall. As proposed above, a quick coupling at the upper ring wall can be provided.

If the wire conduit is spaced from the container and from the upper ring wall of the wire outlet guide, a free space between the conduit and the container may allow deflection and swinging of the wire sidewardly. As emphasized below, however, the inlet end of the wire conduit could also be arranged immediately adjacent to the upper ring wall or attached to the upper ring wall.

If a wire rear feeder device is provided, this device can be arranged between the upper ring wall and the inlet end of the wire conduit. The wire rear feeder may adjoin the upper ring wall or be slightly or significantly distanced therefrom. A quick coupling allows connecting the wire rear feeder to the wire outlet guide.

The tube or the box defining the connecting wall can be of any material, plastic or cardboard but a transparent material like plexiglas is recommended to allow a visual inspection of the passing wire.

The connecting wall has a wider rim at its upper end which will prevent it from inadvertently falling inside the container and this feature will facilitate the operator who can temporarily push the tube completely inside the pack during the initial wire insertion and then easily pull it up and connect it to the feeder device or the conduit to start the welding process.

A gap between the connecting wall and the front wall can be sealed with a brush or a soft rubber gasket, to prevent dirt, dust or mixture from penetrating inside the pack, thus affecting the wire.

DETAILED DESCRIPTION OF THE INVENTION

Figure 1:
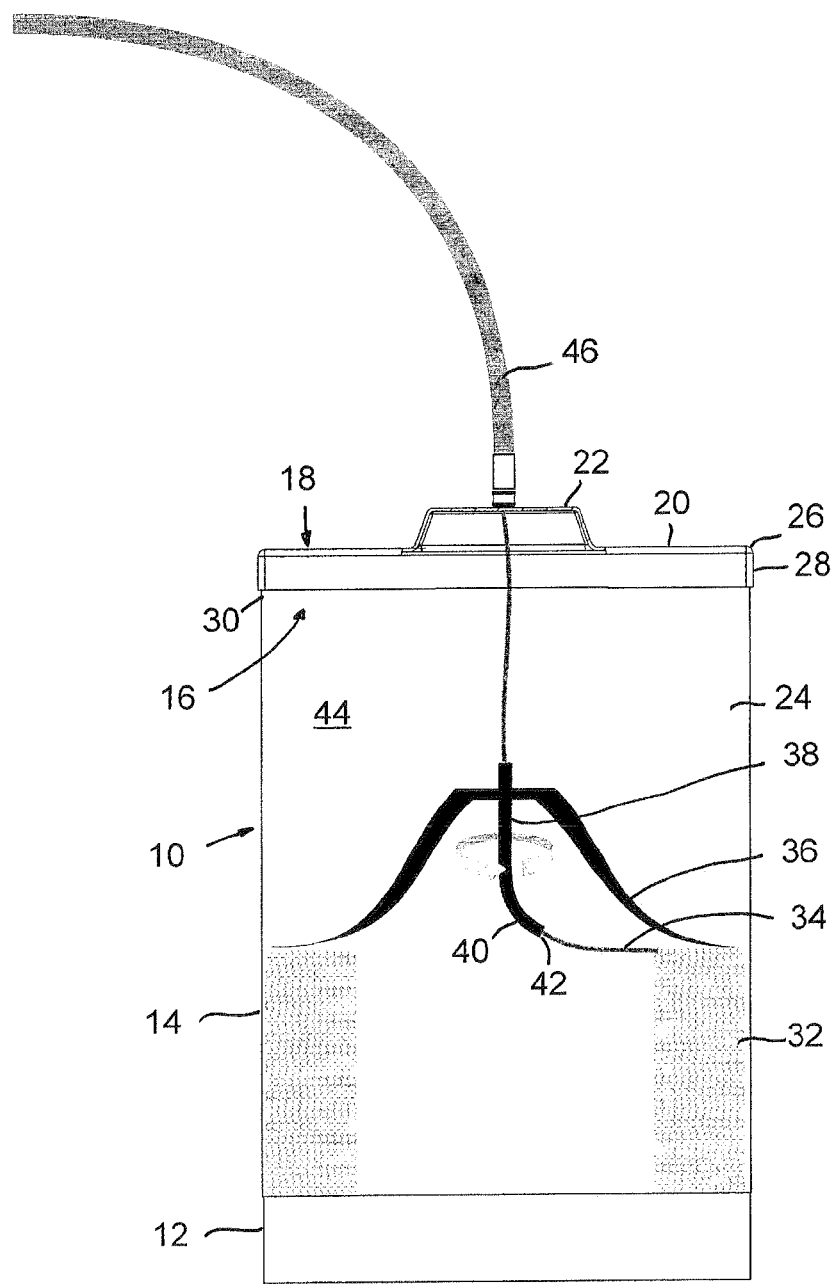
FIG. 1 schematically shows a typical prior art configuration.

FIG. 1 shows a first prior art wire container of a wire feeding system. The wire container comprises a box 10 having a closed bottom 12 from which a box sidewall 14 protrudes upwardly. The box sidewall 14 is circumferentially closed and defines a cylinder. Box 10 has an upper open end 16 which is closed by a lid 18.

Lid 18 is pot-shaped and comprises a front wall 20 having a central dome 22 which protrudes upwardly, i.e. away from the interior 24 of the container.

Front wall 20 has an outer, circumferential edge 26 from which a cylindrical, circumferentially closed wall 28 protrudes downwardly. Cylindrical wall 28 encompasses an upper end area 30 of the box sidewall 14 to be sidewardly fixed and attached to box 10.

In the interior 24 of the container, a package 32 of coiled welding wire 34 of steel or aluminum (or a metal spray wire or any other wire) is housed.

A retainer 36 rests on the upper end of package 32 and has a conical, dome-shaped design. Retainer 36 carries a guiding tube 38 which has a bow-shaped lower end portion 40 with an inlet hole 42 facing the upper, inner end of package 32.

Tube 38 is attached to retainer 36 in a rotational manner so that inlet hole 42 has no fixed position relative to box 10.

Welding wire 34 is protruding from the upper end of package 32 through inlet hole 42 into a space 44 within the container which is empty and which extends from the upper side of retainer 36 to lid 18.

From the upper end of tube 38 welding wire 34 extends through a central opening in dome 22 and into a wire conduit 46. Conduit 46 is attached to dome 22 and extends to a wire consumer, e.g. a welding tool. Conduit 46 can be easily decoupled from lid 18.

Welding wire 34 is pulled and paid off from the container by a driving means, e.g. a front feeding system arranged close to the consumer, i.e. to the welding tool. Thus, welding wire 34 is tensioned between dome 22 and the upper end of tube 38. When wire 34 is paid off from package 32 tube 38 rotates within retainer 36.

Figure 2:
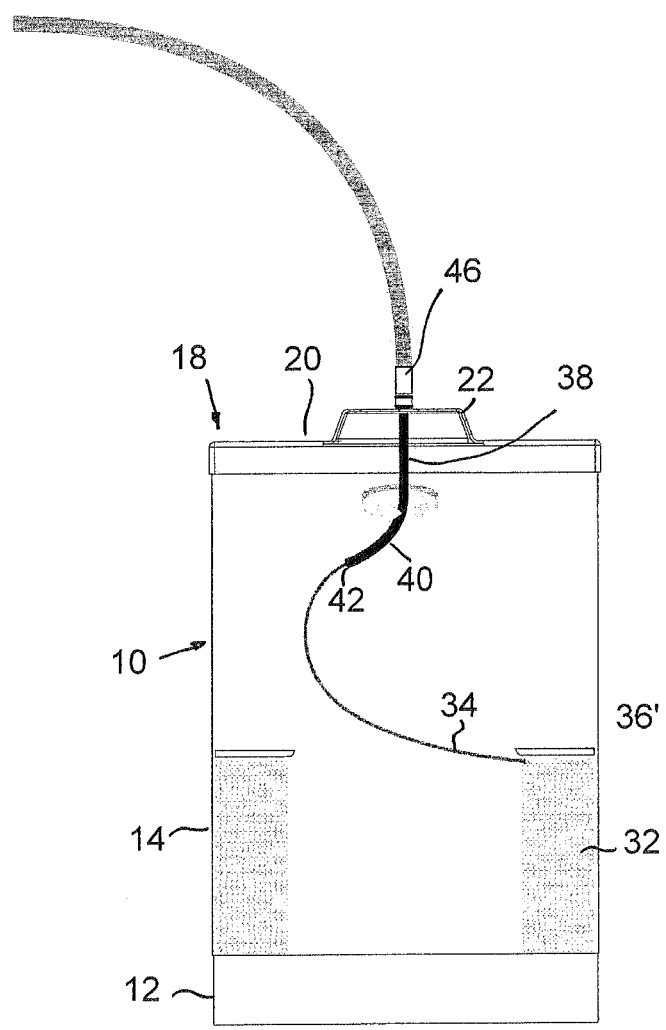
FIG. 2 schematically shows another typical prior art configuration.

FIG. 2 shows a further embodiment according to the prior art, wherein corresponding parts or portions which have already been introduced by FIG. 1 carry the same reference numerals. In the following, the differences to the embodiment according to FIG. 1 are discussed, only.

Retainer 36 is replaced by a retainer ring 36' which rests on wire package 32 but is not closed rather than fully open within the ring-shaped wire package (seen from above).

Tube 38 is rotatably attached to dome 22 so that welding wire 34 extends bow-shaped portion 40 and is tensioned between retainer ring 36' and inlet 42.

Figure 3:
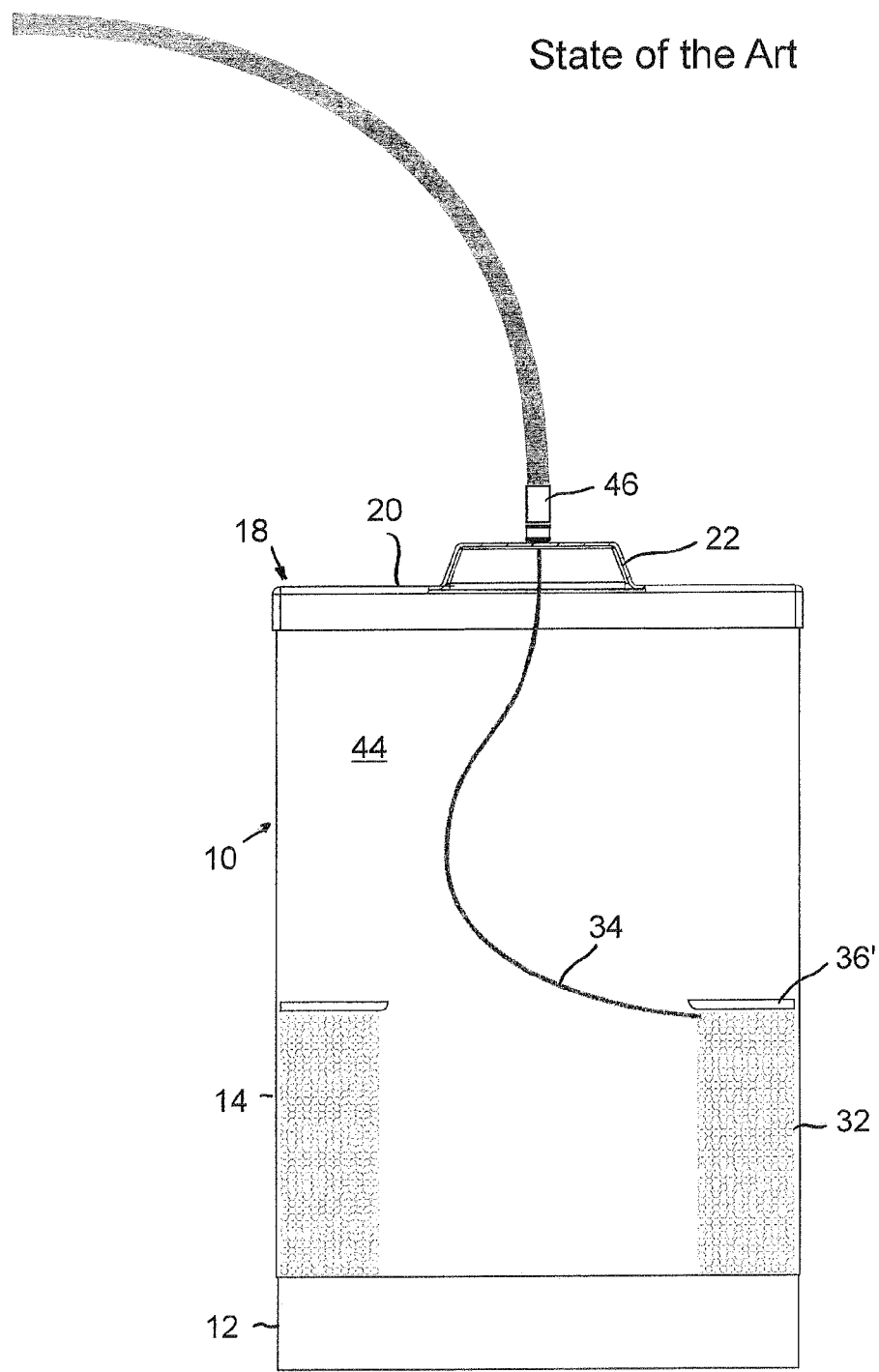
FIG. 3 schematically shows yet another typical prior art configuration.

The third embodiment according to prior art solutions shown in FIG. 3 differs from the FIG. 2 embodiment by not having a rotatable tube 38. Instead, welding wire 34 is not guided between retainer ring 36' and conduit 46.

All embodiments according to the prior art shown before are suffering from wire tangle, wire jam or knob formation inside the container which may eventually arise. Further, the wire tension can eventually increase or decrease leading to wire twist or wire accumulation or wire knobs. Although these defects occur rarely, they can lead to a cost intensive breakdown of the welding process.

The above drawbacks can be reduced or avoided by a wire feeding system according to the following figures.

Figure 4:
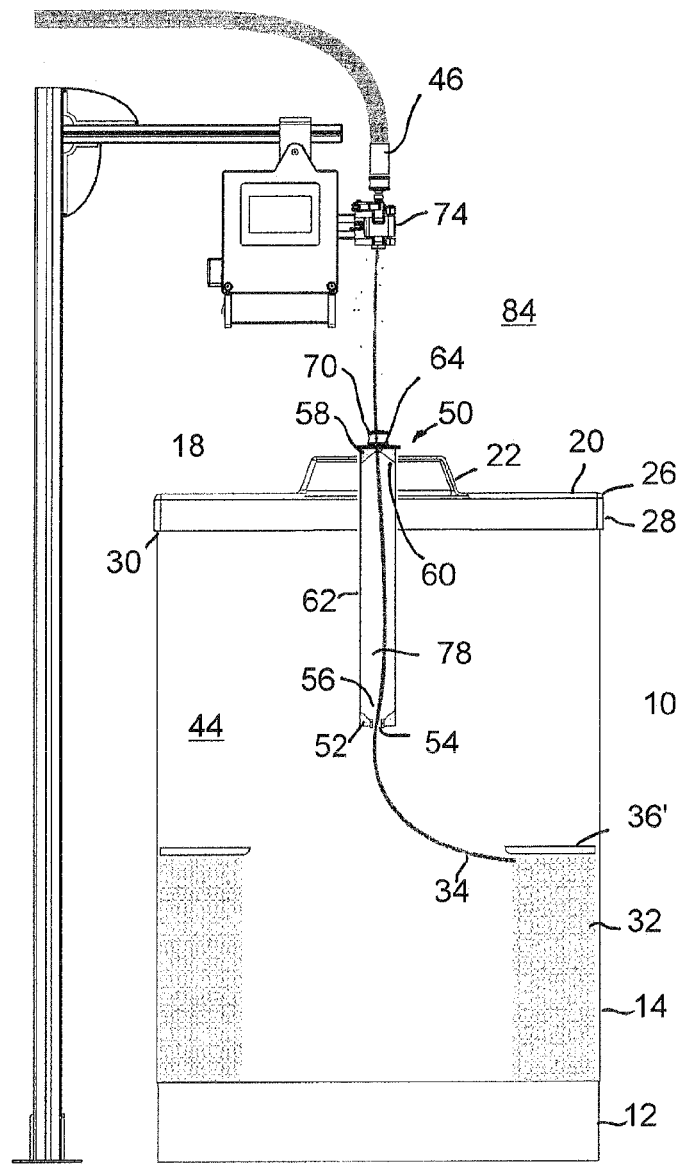
FIG. 4 shows a first embodiment of the wire feeding system, the wire container and its lid according to the present invention, with a rear feeder device.

FIG. 4 shows a wire feeding system with a wire container having a specific lid.

Again, structurally or functionally similar or identical parts or portions to those already discussed in FIGS. 1 to 3 are provided with the reference numerals used and introduced before with respect to FIGS. 1 to 3 which are introduced by reference. In the following, the differences to the prior art systems are explained.

The container shown in FIG. 4 does not comprise a rotatable tube-like tube 38 as shown in FIGS. 1 and 2 having a bent lower end facing to the upper end of the package 32.

Figure 9:
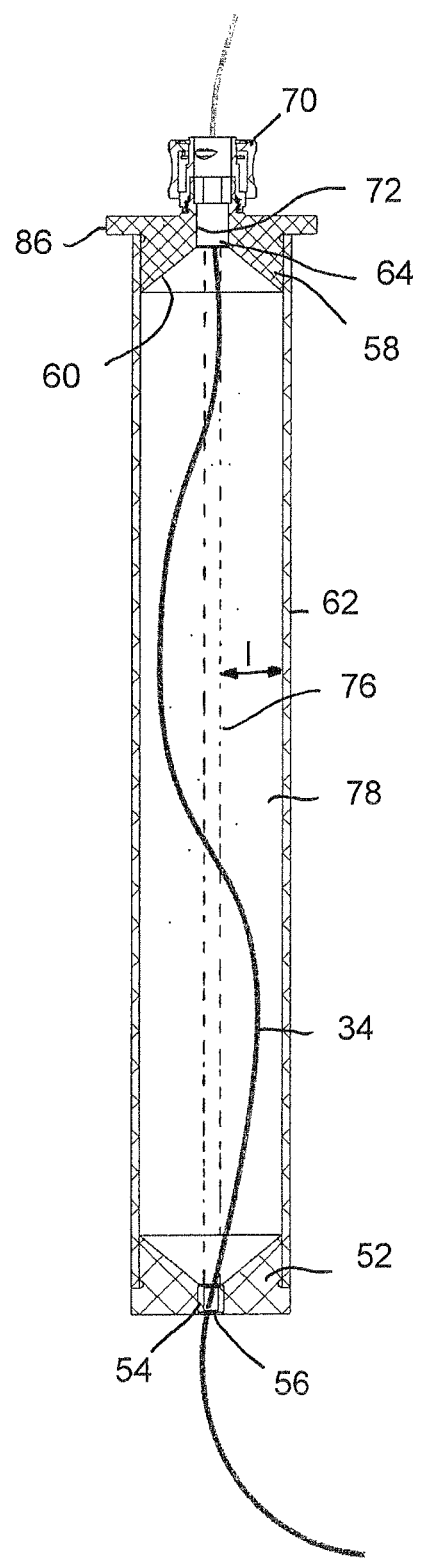
FIG. 9 shows a cross section of the wire outlet guide shown in FIG. 8.
Figure 10:
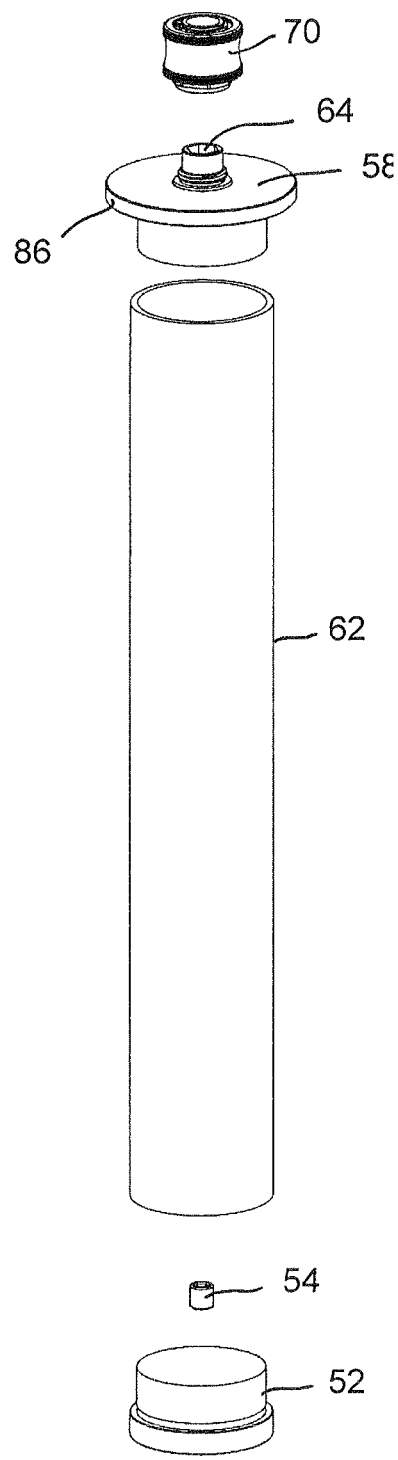
FIG. 10 shows a explosive view of the wire outlet guide according to FIG. 9.

Instead, a wire outlet guide 50 which is separately shown in FIGS. 9 and 10 is provided and attached to lid 20. It is to be emphasized that lid 20 can have a central dome 22 which, however, is not obligatory. Generally speaking, wire outlet guide 50 is arranged at the central point of lid 18 and its front wall 20.

Wire outlet guide 50 is box- or tube-like and has a lower end wall 52 with a central ring wall 54 circumscribing a lower hole 56 through which welding wire extends when being paid off from package 32. Ring wall 54 is defined by a ring-shaped insert part in the form of a nozzle made of a material having a higher hardness than the material of the wire. More specifically, the ring-shaped insert part is made of ceramics.

An upper end wall 58 which is also nozzle-shaped and has a conically inner surface 60 is distanced from lower end wall 52 by a connection wall 62.

Connection wall 62 is box-like or tube-like and preferably circular cylindrical.

Connection wall 62 can be of transparent material, e.g. of plexiglass, in order to allow inspection of wire 34 protruding through wire outlet guide 50. If front wall 20 or its dome 22 are partly or fully of transparent material, movement and extension of wire 34 within the container can be monitored from the outside during the welding operation.

Wire 34 extends through an upper hole 64 in upper end wall 58 to the outside of the container. Upper end wall 58 can be provided with a quick coupling 70 which can be permanently or removably attached from the remainder of upper end wall 58. Upper end wall 58 or its ring-shaped quick coupling 70 defines the portion of the upper hole 64 having the smallest diameter or cross sectional area through which wire 34 is guided and at which wire may contact the corresponding upper ring wall, i. e. the area of the hole having the smallest diameter or cross-sectional area. In the embodiment according to FIG. 9, the upper ring wall 72 is provided in end wall 58.

It is to be emphasized that the upper end wall 58 does not have to be provided with the quick coupling 70. Quick coupling 70 may, however, facilitate attachment of conduit 46 or a wire rear feeder 74 which drives wire 34 and supports a wire front feeder arranged close to or at a welding tool.

As can be seen from FIG. 9, the inner diameter or cross-section of connection wall 62 is significantly larger than the diameter or the cross-section of upper and lower holes 56 and 64. Connection wall 62 is significantly larger than the diameters and the cross-sections of lower hole 56 and upper hole 64.

Lower hole 56, upper hole 64 and the radial inner side of connection wall 62 are coaxially arranged to each other.

The inner diameter or cross-section of hole 56 can be slightly smaller than the diameter or cross-sectional area of upper hole 64.

A virtual cylinder 76 of maximum diameter or cross sectional area contacting the smaller of one of holes 54 and 72 and coaxially extending through both holes 56 and 64 is shown in broken lines in FIG. 9. The inner surface of connecting wall 62 is distanced from virtual cylinder 76 by at least 10 mm (see radius I). Thus, a deflection space 78 is defined by the hollow interior of connection wall 62 and by end walls 52 and 58.

The axial length (which is the wire feeding direction) of the deflection space, i.e. the axial distance of the ring walls 56 and 64 is 350 to 600 mm. This axial length and the radial dimension of the deflection space in connection with the diameters of holes 56 and 64 allow wire 34 to freely swing, float and deflect sidewards within deflection space 78 as can be seen from FIG. 9. It has been proven that slightly tensioned wire when passing through hole 56 is able to freely move and swing within deflection space 78 in order not to build up sufficient tension to cause knots. The tension of wire 34 is not built up or discharged in the wire portion between package 32 and lower hole 56. Instead, the tension is kept and discharged within wire outlet guide 50.

In any case, there is no further guide between holes 56 and 64. Further, hole 64 and its ring wall 72 are the wire guide of lid 18 which is most distanced from front wall 20 on its upper side.

Furthermore, at least one of the ring walls 54 and 64 define the only wire guide of the container between retainer ring 36' and the outside of the container. Thus, wire 34 can freely extend from below retainer ring 36' to the lower hole 56 without a wire guiding means arranged therebetween.

Wire outlet guide 50 can be fixedly attached to front wall 20 or can be axially displaceable, i.e. vertically displaceable attached to front wall 20. Connection wall 62 extends or may extend through a corresponding opening in front wall 20 or dome 22. Depending on the position of wire outlet guide 50 with respect to front wall 20, wire outlet guide 50 may completely or almost completely protrude into the interior of container as shown in FIG. 4 or mainly or completely protrude out of the container as shown in FIG. 5.

Figure 8:
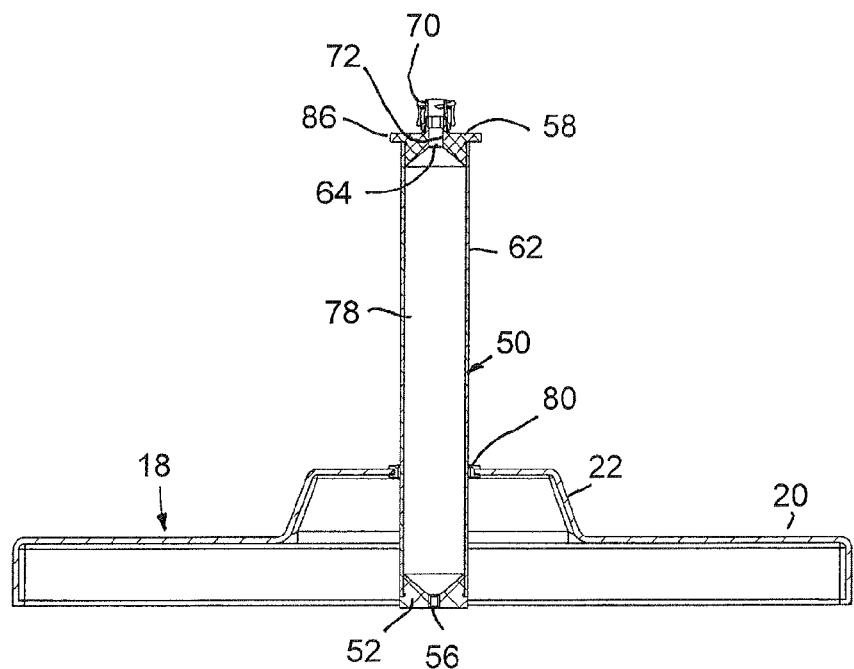
FIG. 8 shows a cross section of the lid shown in FIGS. 5 and 7.

For holding and aligning connection wall 62 to front wall 20, a sealing means 80 (see FIG. 8) seals and bridges a potential gap between front wall 20 and the outer surface of connection wall 62. Sealing means 80 can be a brush, a flexible rubber or foam. Sealing means 80 further could be the only means to attach and align wire outlet guide to front wall 20.

In the embodiment according to FIG. 4, wire rear feeder 74 is arranged distanced from hole 64 to define a free space 84 in which wire 34 can deflect sidewardly, depending on the tension by which wire 34 is pulled out of the container.

Figure 5:
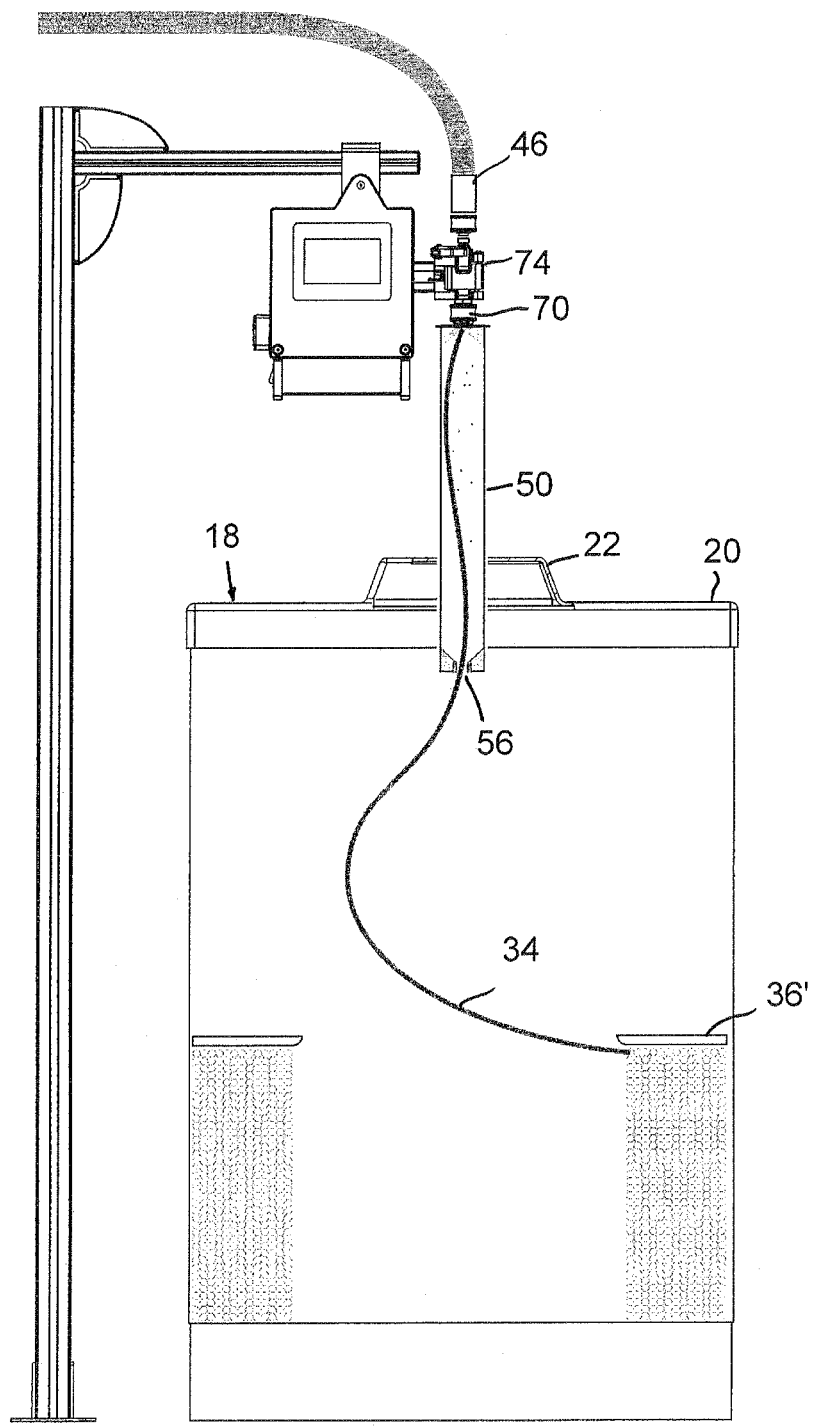
FIG. 5 shows the first embodiment of the wire feeding system, the wire container and its lid according to the present invention, wherein the wire outlet guide significantly protrudes out from the container to the rear feeder device.

In the embodiment according to FIG. 5 which corresponds to the embodiment according to FIG. 4, the tube-shaped wire outlet guide 50 is shifted almost completely out from the container or is permanently and fixedly attached to front wall 20 to protrude from the upper side of front wall 20. In this embodiment, wire outlet guide 50 bridges the distance between front wall 20 and its dome 22 and wire rear feeder 74.

Quick coupling 70 may allow attachment of the other end of wire outlet guide to wire rear feeder 74. Thus, wire outlet guide 50 is attached to front wall 20 and wire rear feeder 74. In this embodiment, the distance between retainer ring 36' and first and lower hole 56 is increased compared with the embodiment according to FIG. 4.

In the embodiment according to FIG. 4, initial inserting of wire 34 through holes 56 and 64 is facilitated. After inserting the wire, wire outlet guide 50 may be pulled outwardly to the position according to FIG. 5. However, the designs shown in FIGS. 4 and 5 can also be permanent designs, i.e. wire could be paid off in the position of the wire outlet guide in FIG. 4 or in FIG. 5.

Figure 6:
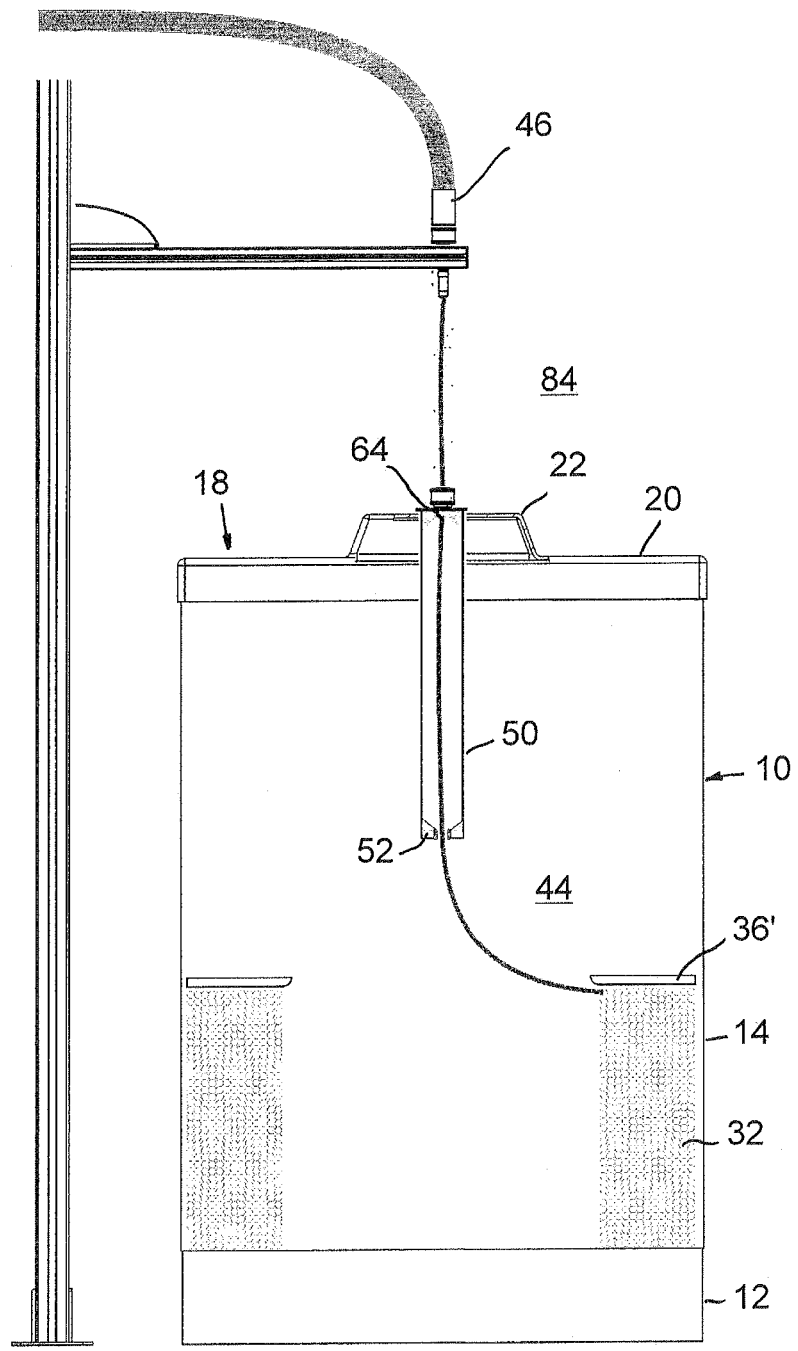
FIG. 6 shows the second embodiment of the wire feeding system, the wire container and its lid according to the present invention without a rear feeder device.
Figure 7:
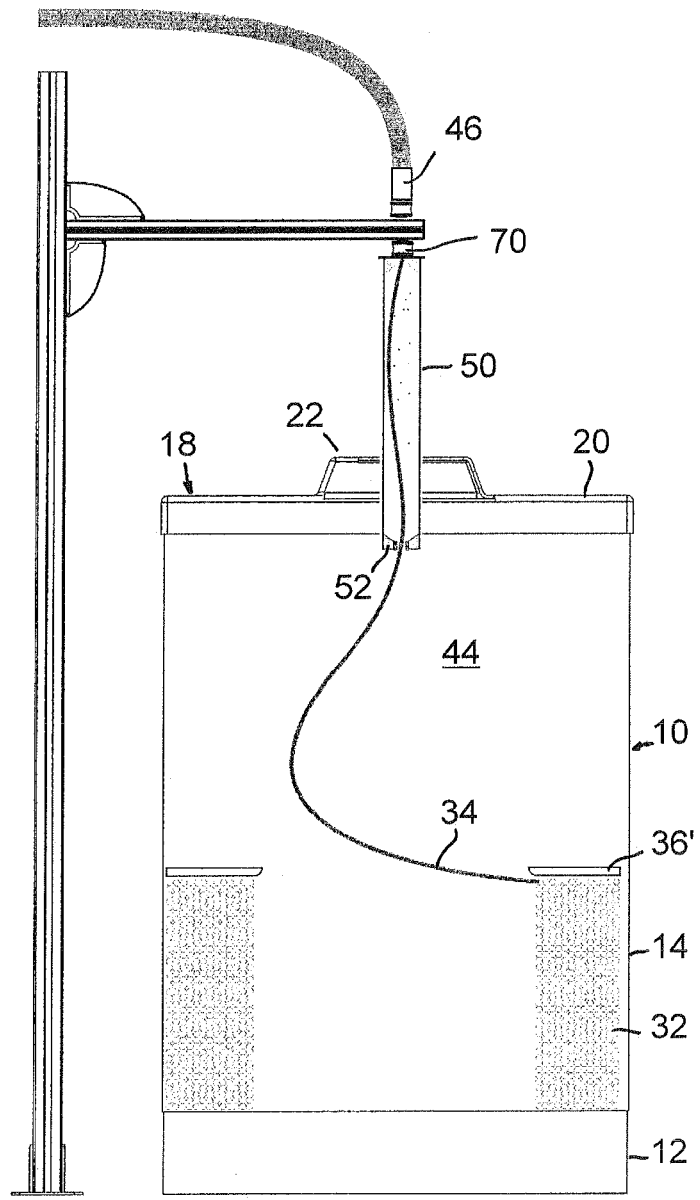
FIG. 7 shows the second embodiment of the wire feeding system, the wire container and its lid according to the present invention, wherein the wire outlet guide significantly protrudes out from the container to the wire conduit.

The embodiment according to FIG. 6 corresponds to the embodiment according to FIG. 4, and the embodiment according to FIG. 7 corresponds to the embodiment according to FIG. 5, wherein in both figures no wire rear feeder 74 is used. Therefore, wire 34 when leaving wire outlet guide 50 is guided outside of the container by conduit 46. In the embodiment according to FIG. 6 or in the position of the wire outlet guide 50 according to FIG. 6, the free space 84 is arranged between the inlet of conduit 46 and the wire outlet guide 50.

In the embodiment according to FIG. 7 or in the position of the wire outlet guide according to FIG. 7, wire outlet guide 50 is coupled to conduit 46 by quick coupling 70. A radially outwardly extending rim 86 at the upper end of the connection wall ensures that the wire outlet guide cannot fall into the container.

In the previous embodiments, circumferentially closed connecting wall 62 protects wire 34 from influences from outside the deflection space.

Figure 11:
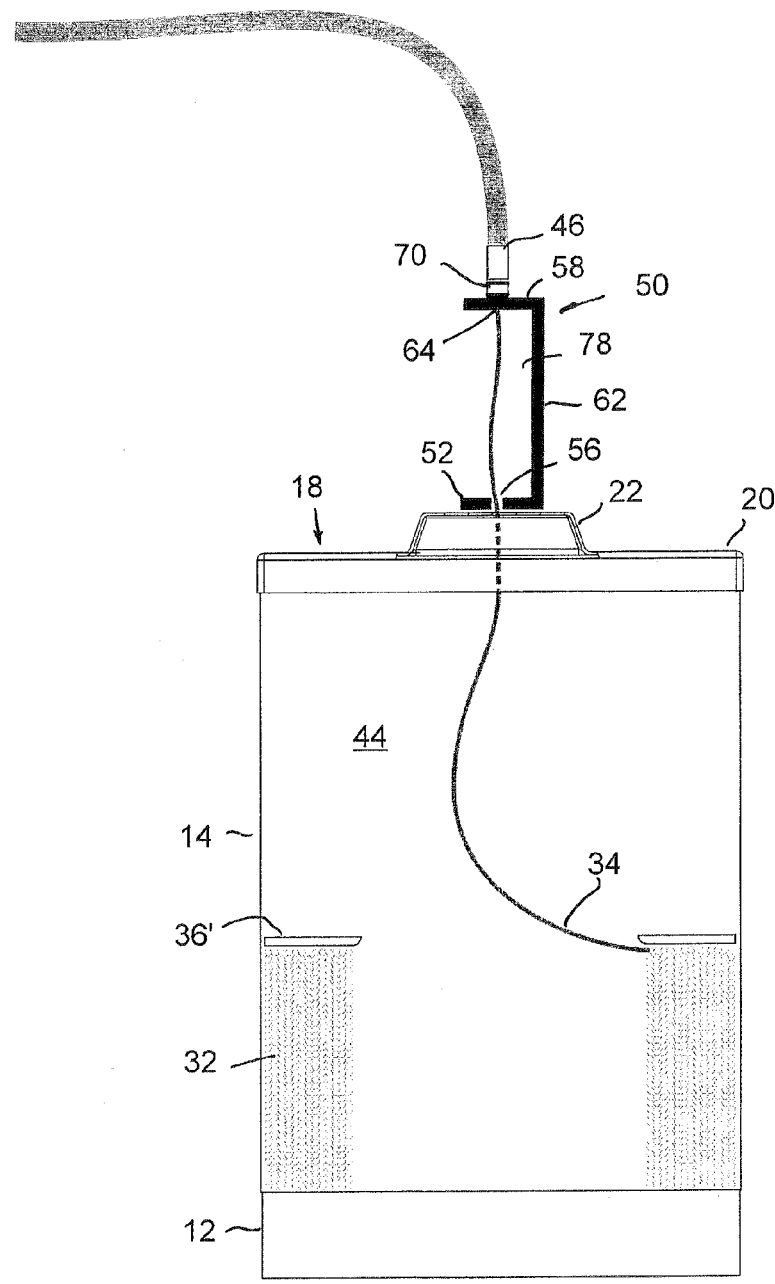
FIG. 11 shows the third embodiment of the wire feeding system, the wire container and its lid according to the present invention.

The embodiment according to FIG. 11 has a wire outlet guide which is attached or positioned on top of front wall 20 or its dome 22. Deflection space 78 is open to the environment, and the wire outlet guide 50 is an U-shaped part with two sideward legs defining upper and lower end wall 58, 52 comprising holes 64 and 56 which legs are bridged by connection wall 62. Conduit 46 is attached to upper end wall 58 via quick coupling 70. Lower end wall 52 is attached to dome 22.

Although wire 34 is without protection from outside, wire 34 can swing and float sidewardly in the deflection space.

Figure 12:
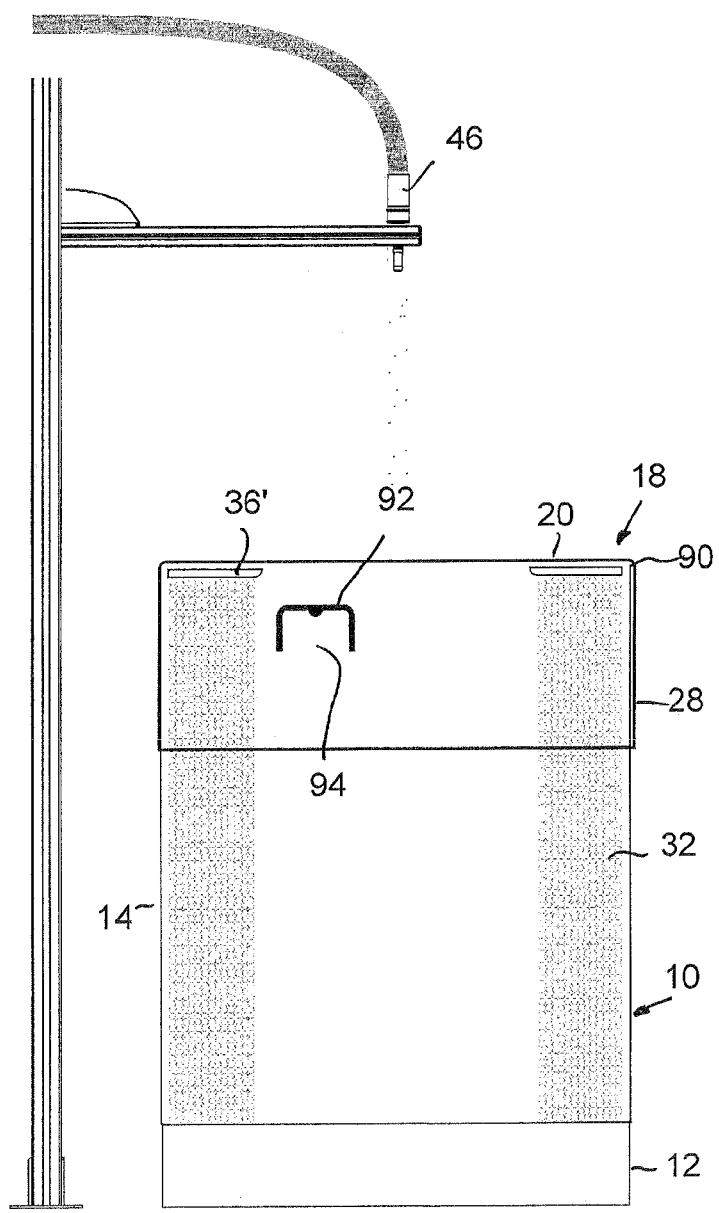
FIG. 12 shows the forth embodiment of the wire feeding system, the wire container and its lid according to the present invention, wherein the lid is in a lower position and the wire outlet guide is not yet attached to the lid.
Figure 13:
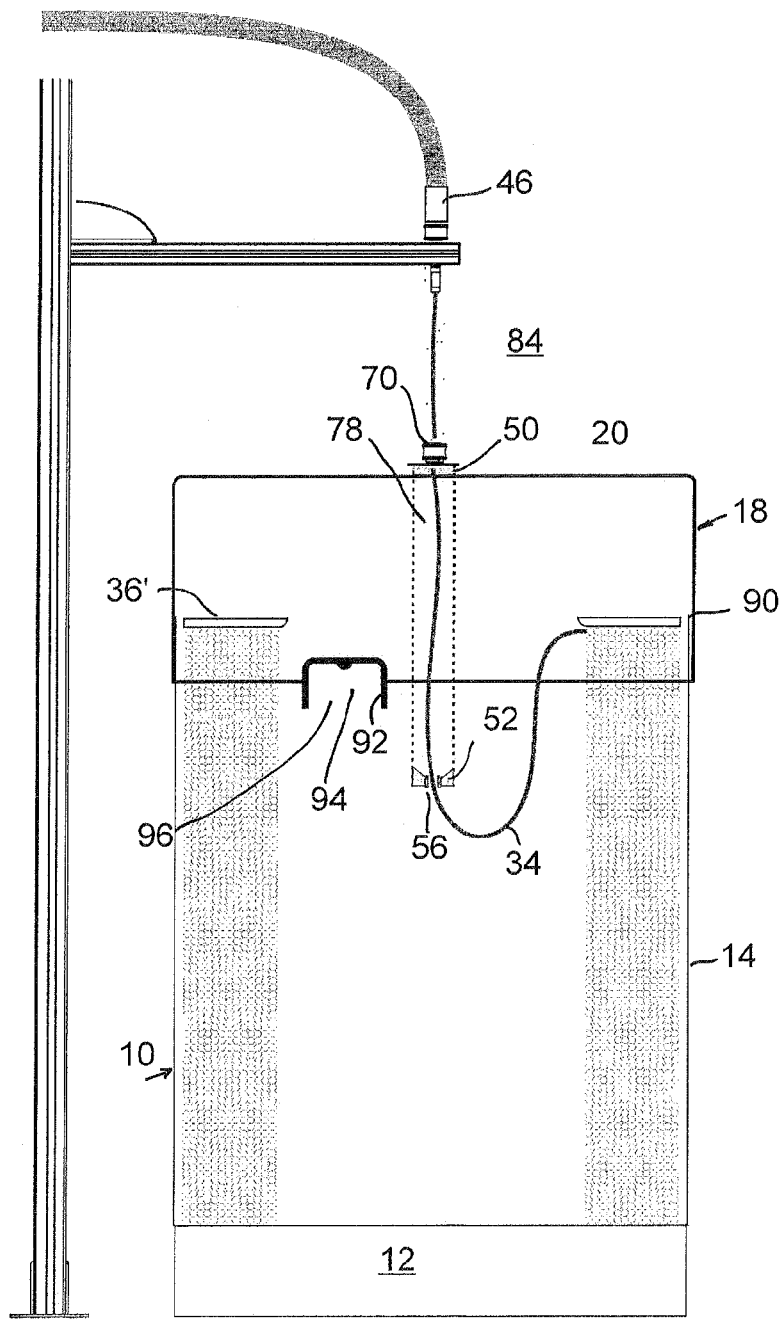
FIG. 13 shows the forth embodiment, wherein the lid is in a raised position and the wire outlet guide is attached to the lid in a lower position.
Figure 14:
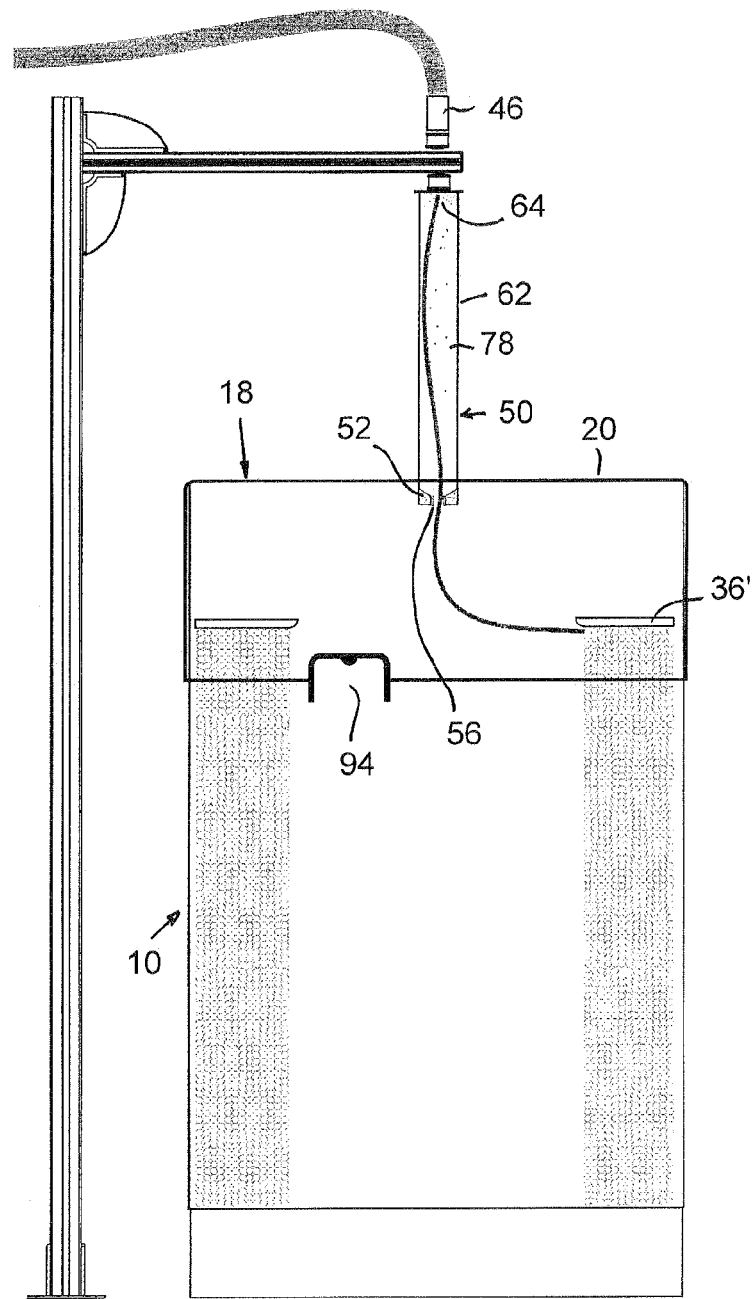
FIG. 14 shows the forth embodiment, wherein the lid is in a raised position and the wire outlet guide is attached to the lid in an upper position.

The embodiment according to FIGS. 12 to 14 differs from the embodiments according to the previous FIGS. 4 to 10 by the lid 18 having an axially or vertically longer cylindrical wall 28.

In the position of the lid 18 according to FIG. 12, lid 18 is in the low or lower most position in which front wall 20 is close to upper edge 90 of the box sidewall 14. This position is the transport position of the container.

For the payoff-position of the container, lid 18 is raised in a raised position (see FIGS. 13 and 14) in which the front wall 20 is significantly distanced from upper edge 90 so that there is sufficient space for wire 34 to freely protrude into wire outlet guide 50.

Box sidewall 14 has a U-cut 92 circumscribing a tongue 94 which integrally extends into the remainder of box sidewall 14 along a hinge portion 96. Tongue 94 can be pulled outwardly or, more precisely, pivoted outwardly so that tongue 94 defines a stop portion for lid 18 which is prevented from moving down to the position according to FIG. 12.

The FIG. 14 embodiment differs from the FIG. 13 embodiment by the wire outlet guide 50 being arranged with respect to the front wall 20 so as to protrude significantly out from the container and to bridge the distance from the front wall to conduit 46. Again, wire outlet guide 50 can be displaceable with respect to the front wall or can be permanently fixed and non-displaceable attached to front wall 20. In any case, holes 56 and 64 are in a fixed position during payoff of wire 34.

The invention claimed is:

1. A wire container lid for closing an upper side of a wire box filled with coiled wire, the lid comprising
    a front wall having an opening through which wire is to be paid off,
    a wire outlet guide attached to the front wall, the wire outlet guide comprising an upper and a lower hole for receiving the wire, the upper hole and lower hole being defined by a lower ring wall and an upper ring wall, respectively, and the upper hole and the lower hole being distanced from each other in a wire feeding direction,
    at least the lower ring wall limiting sideward movement of the wire and allowing contact with the wire,
    the upper hole and the lower hole each having a fixed position relative to the front wall during payoff of the wire, and
    a deflection space bridging the distance between the upper hole and the lower hole for allowing sideward deflection and swing of the wire between the ring walls,
    wherein the wire outlet guide is one of displaceable and shiftably attached to the front wall, and
    wherein the wire outlet guide is displaceable or shiftable between a first position for transport purpose, in which the wire outlet guide extends completely or mainly into the interior of the wire box, and a second position for welding operation, in which the wire outlet guide extends completely or mainly out of the wire box.

2. The wire container lid according to claim 1, wherein the wire outlet guide has a connection wall connecting the ring walls, the connection wall being radially distanced at least 10 mm from a virtual cylinder of maximum cross-section extending through both holes.

3. The wire container lid according to claim 2, wherein the connection wall has one of a box-like and tube-like shape limiting an interior of the deflection space.

4. The wire container lid according to claim 3, wherein the connection wall is at least one of cylindrical and transparent.

5. The wire container lid according to claim 3, wherein the connection wall carries an upper and a lower end wall comprising the upper and the lower ring wall, respectively.

6. The wire container lid according to claim 1, wherein at least one of the upper and the lower ring walls is defined by a ring-shaped insert part.

7. The wire container lid according to claim 6, wherein the ring-shaped insert part is a nozzle made of a material having a higher hardness than the material of the wire.

8. The wire container lid according to claim 1, wherein the upper and the lower ring walls are distanced from each other by 350 to 600 mm.

9. The wire container lid according to claim 1, wherein the front wall has a lower side facing the interior of the box and an opposite upper side, the wire outlet guide protruding from at least one of the upper and lower sides.

10. The wire container lid according to claim 1, wherein the upper ring wall is the wire guide of the lid which is most distanced from the front wall on its upper side.

11. The wire container lid according to claim 10, wherein the upper ring wall comprises a quick coupling that allows connection to one of a wire rear feeder and a wire guiding conduit extending to a wire consumer.

12. A wire container, comprising
a box having an open upper side, and
a wire container lid closing the upper side, the wire container lid including
 a front wall having an opening through which wire is to be paid off,
 a wire outlet guide attached to the front wall,
 the wire outlet guide comprising an upper hole and a lower hole for receiving the wire, the upper and lower holes being defined by a lower ring wall and an upper ring wall, respectively, and being distanced from each other in a wire feeding direction,
 at least the lower ring wall limiting sideward movement of the wire and allowing contact with the wire,
 the upper hole and the lower hole having a fixed position relative to the front wall during payoff of the wire, and
 a deflection space bridging the distance between the upper hole and the lower hole for allowing sideward deflection and swing of the wire between the ring walls,
 wherein the wire outlet guide is one of displaceable and shiftably attached to the front wall, and
 wherein the wire outlet guide is displaceable or shiftable between a first position for transport purpose, in which the wire outlet guide extends completely or mainly into the interior of the wire box, and a second position for welding operation, in which the wire outlet guide extends completely or mainly out of the wire box, and
a wire which is coiled in the box and extends through the upper hole and the lower hole and sidewardly deflects in the deflection space.

13. The wire container according to claim 12, further comprising a retainer ring lying on the top of a package of coiled wire within the container, the wire freely extending from below the retainer ring to the lower hole without a wire guiding means being arranged in between.

14. The wire container according to claim 13, wherein at least one of the ring walls defines the only wire guide of the container between the retainer ring and the outside of the container.

15. The wire container according to claim 12, wherein the lid has a circumferentially extending cylindrical wall protruding from an circumferential edge of the front wall and encompassing an upper end area of the box side wall, the lid being shiftable between a low position in which the front wall is close to an upper edge of the box side wall and a raised position in which the front wall distanced from the upper edge and in which the container has a larger inner volume than in the low position, the box side wall having at least one sidewardly protruding stop portion for the lid on which the lid rests in the raised position.

16. The wire container according to claim 15, wherein the stop portion is a portion of the box side wall which is defined by a cut in the box side wall and which is bent outwardly along a hinge portion at which the stop portion integrally extends into the remainder of the box side wall.

17. A wire feeding system, comprising a wire container, the wire container including
a box having an open upper side, and
a wire container lid closing the upper side, the wire container lid comprising
 a front wall having an opening through which wire is to be paid off,
 a wire outlet guide attached to the front wall,
 the wire outlet guide comprising an upper hole and a lower hole for receiving the wire, the upper hole and lower hole being defined by a lower ring wall and an upper ring wall, respectively, and being distanced from each other in a wire feeding direction,
 at least the lower ring wall limiting sideward movement of the wire and allowing contact with the wire,
 the upper hole and the lower hole having a fixed position relative to the front wall, and
 a deflection space bridging the distance between the upper hole and the lower hole for allowing sideward deflection of the wire between the ring walls,
 wherein the wire outlet guide is one of displaceable and shiftably attached to the front wall, and
 wherein the wire outlet guide is displaceable or shiftable between a first position for transport purpose, in which the wire outlet guide extends completely or mainly into the interior of the wire box, and a second position for welding operation, in which the wire outlet guide extends completely or mainly out of the wire box,
a wire which is coiled in the box and extends through the upper hole and the lower hole and sidewardly deflects in the deflection space, and
a wire conduit for transporting the wire to a tool having an inlet end for the inlet of wire from the container, the inlet end being one of distanced from the container and attached to the wire outlet guide.

18. The wire feeding system according to claim 17, wherein a free space is provided between the upper ring wall and the inlet end, in which free space the wire is able to deflect and swing sidewardly.

19. The wire feeding system according to claim 17, wherein a wire rear feeder device is arranged between the upper ring wall and the inlet end.

* * * * *